(12) United States Patent
Pfeiffer et al.

(10) Patent No.: US 11,618,276 B2
(45) Date of Patent: Apr. 4, 2023

(54) LENS PIGMENT, METHOD FOR PRODUCING THE SAME, VALUABLE DOCUMENT AND PRINTING INK

(71) Applicant: GIESECKE+DEVRIENT CURRENCY TECHNOLOGY GMBH, Munich (DE)

(72) Inventors: Matthias Pfeiffer, Munich (DE); Christian Fuhse, Otterfing (DE); Maik Rudolf Johann Scherer, Grainau (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 17/434,344

(22) PCT Filed: Feb. 28, 2020

(86) PCT No.: PCT/EP2020/025100
§ 371 (c)(1),
(2) Date: Aug. 26, 2021

(87) PCT Pub. No.: WO2020/177923
PCT Pub. Date: Sep. 10, 2020

(65) Prior Publication Data
US 2022/0153054 A1  May 19, 2022

(30) Foreign Application Priority Data

Mar. 6, 2019 (DE) .......................... 102019001570.3

(51) Int. Cl.
*B42D 25/378* (2014.01)
*B42D 25/324* (2014.01)
(Continued)

(52) U.S. Cl.
CPC ........ *B42D 25/36* (2014.10); *B29D 11/00307* (2013.01); *B42D 25/29* (2014.10);
(Continued)

(58) Field of Classification Search
CPC ...... B42D 25/378; B42D 25/324; C09D 7/70; C09D 11/02; C09D 11/30; C09D 11/322;
(Continued)

(56) References Cited

U.S. PATENT DOCUMENTS 4,053,433 A * 10/1977 Lee ........................... G09F 3/00
149/19.5
4,765,656 A    8/1988 Becker et al.
(Continued)

FOREIGN PATENT DOCUMENTS

CA         2732989 A1    2/2010
DE    102006003798 A1    7/2007
(Continued)

OTHER PUBLICATIONS

International Search Report with Written Opinion from PCT Application No. PCT/EP2020/025100, dated Jun. 16, 2020.
(Continued)

*Primary Examiner* — Kyle R Grabowski
(74) *Attorney, Agent, or Firm* — Workman Nydegger

(57) ABSTRACT

A lens pigment suitable for manufacturing value documents by printing technology, includes a carrier substrate which forms a lens base and which is supplied on its front side with a first plastic having at least one elevation that produces a microlens and with a second plastic leveling the first plastic.

17 Claims, 4 Drawing Sheets

(51) Int. Cl.
  *C09D 7/00* (2018.01)
  *C09D 5/00* (2006.01)
  *B42D 25/36* (2014.01)
  *B42D 25/29* (2014.01)
  *B42D 25/425* (2014.01)
  *B42D 25/45* (2014.01)
  *C09D 7/40* (2018.01)
  *B29D 11/00* (2006.01)
  *C09D 11/02* (2014.01)
  *C09D 5/03* (2006.01)

(52) U.S. Cl.
  CPC ......... *B42D 25/324* (2014.10); *B42D 25/378* (2014.10); *B42D 25/425* (2014.10); *B42D 25/45* (2014.10); *C09D 5/031* (2013.01); *C09D 7/70* (2018.01); *C09D 11/02* (2013.01)

(58) Field of Classification Search
  CPC ... C09D 5/031; B29D 11/00307; B41M 3/148
  USPC .......................... 428/32.1, 402, 406; 106/400
  See application file for complete search history.

(56) References Cited

U.S. PATENT DOCUMENTS

| | | |
|---|---|---|
| 5,712,731 A | 1/1998 | Drinkwater et al. |
| 8,557,369 B2 | 10/2013 | Hoffmüller et al. |
| 8,778,481 B2 | 7/2014 | Kaule et al. |
| 2008/0024846 A1 | 1/2008 | Tompkin et al. |
| 2008/0160226 A1 | 7/2008 | Kaule et al. |
| 2010/0109317 A1 | 5/2010 | Hoffmüller et al. |
| 2014/0210200 A1 | 7/2014 | Bornschlegl et al. |
| 2017/0091783 A1* | 3/2017 | Mancevski ...... G06K 19/06028 |

FOREIGN PATENT DOCUMENTS

| | | | |
|---|---|---|---|
| DE | 102008036482 A1 * | 2/2010 | ............ B42D 25/30 |
| EP | 0219012 A2 | 4/1987 | |
| EP | 0698256 B2 | 1/2001 | |
| EP | 1147912 A2 | 10/2001 | |
| EP | 1878584 A2 | 1/2008 | |
| EP | 2062947 A1 | 5/2009 | |
| GB | 2549780 A * | 11/2017 | ............ B29C 59/04 |
| WO | 2006016265 A1 | 2/2006 | |
| WO | 2006087138 A1 | 8/2006 | |
| WO | 2008098753 A1 | 8/2008 | |
| WO | 2010015383 A1 | 2/2010 | |
| WO | 2012130370 A1 | 10/2012 | |
| WO | 2013056825 A1 | 4/2013 | |
| WO | WO-2013056825 A1 * | 4/2013 | ....... B29D 11/00596 |
| WO | WO-2017009616 A1 * | 1/2017 | ............ B42D 25/29 |
| WO | 2017187172 A1 | 11/2017 | |

OTHER PUBLICATIONS

Hutley et al., "The Moire Magnifier," Pure and Appl. Opt., vol. 3, Mar. 1, 1994, pp. 133-142.

Kamal et al., "Properties of Moire Magnifiers," Optical Engineering, vol. 37, Issue 11, Nov. 30, 1998, pp. 3007-3014.

* cited by examiner

FIG 1
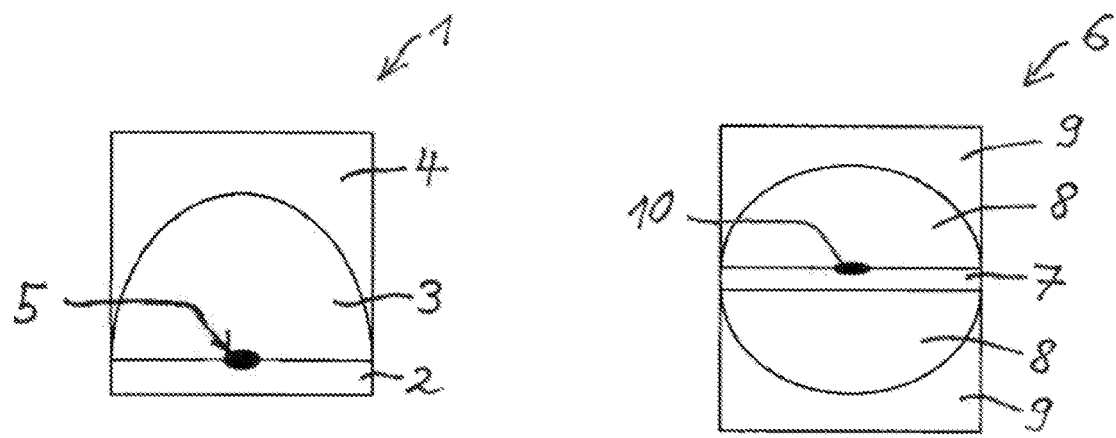
FIG 2
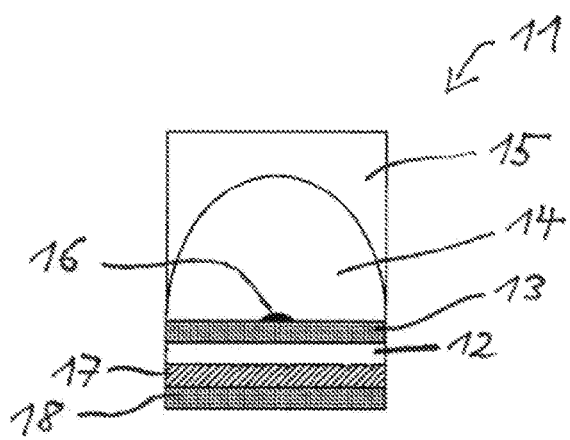
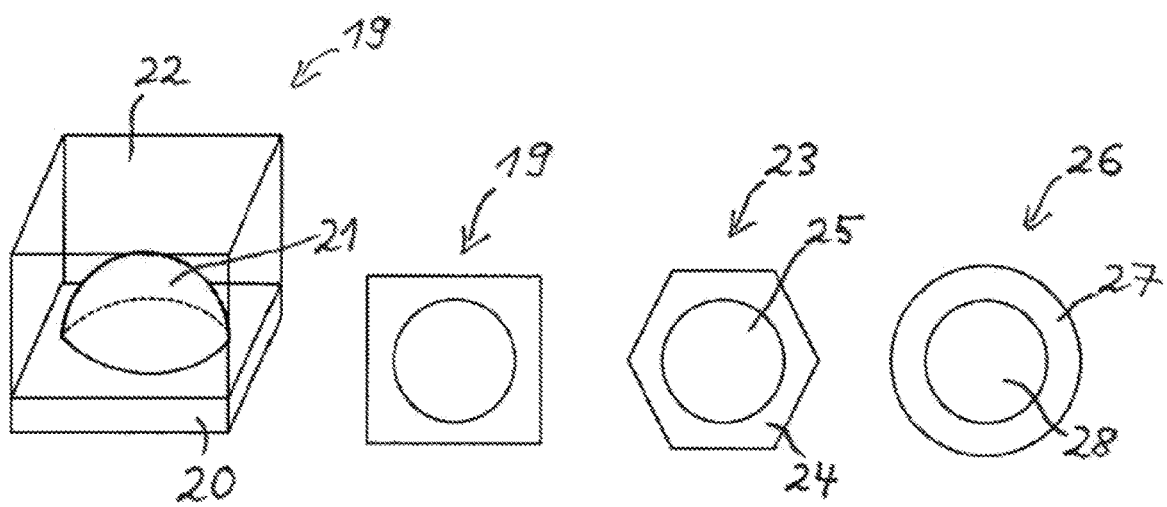
FIG. 3a     FIG. 3b     FIG. 3c     FIG. 3d FIG 4
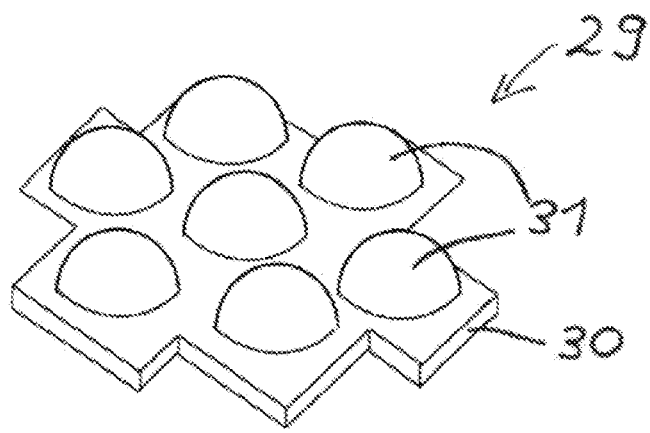
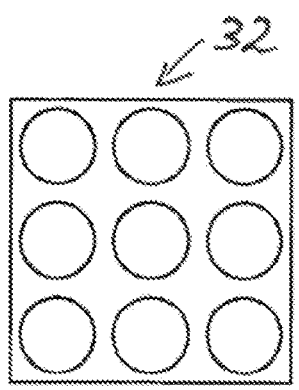
FIG. 5a
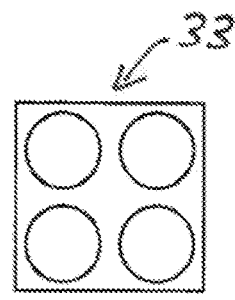
FIG. 5b
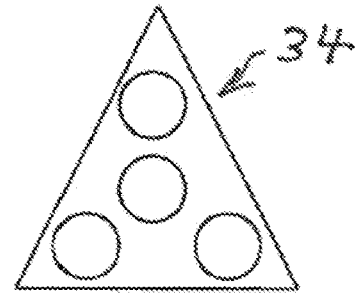
FIG. 5c
FIG 6
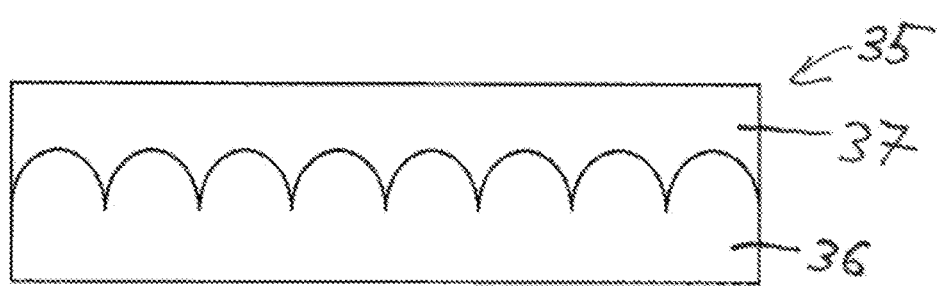
FIG 7
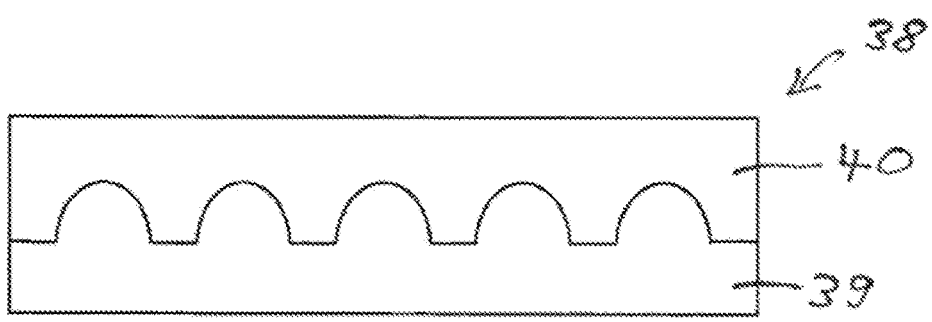

LENS PIGMENT, METHOD FOR PRODUCING THE SAME, VALUABLE DOCUMENT AND PRINTING INK

BACKGROUND

The invention relates to a lens pigment suitable for the manufacture by printing technology of value documents, for example banknotes. The invention further relates to a value document supplied with the lens pigment, a method for manufacturing the lens pigment and a printing ink containing the lens pigment.

Data carriers, such as value documents or identification documents, or also other objects of value, such as branded articles, are often supplied for safeguarding purposes with security elements which permit a check of the authenticity of the object and which at the same time serve as protection from unauthorized reproduction.

The term "data carrier" also comprises precursors of such data carriers that are unfit for circulation and are present, for example in the case of security paper, in quasi endless form and are processed further at a later time. Data carriers according to the present invention are in particular banknotes, shares, bonds, deeds, vouchers, checks, high-quality admission tickets, but also other papers at risk of forgery, such as passports and other identification documents, and also card-shaped data carriers, in particular chip cards, and product protection elements, such as labels, seals, packages and the like.

A security element can be embedded in such a data carrier, for example in a banknote or a chip card, or be configured as a self-supporting transfer element, for example as a patch or as a label, which after its production is applied to a data carrier or other object to be secured.

Security elements frequently produce a readily visible optical impression, so that such security elements, besides their function as protection means, are sometimes also employed exclusively as decorative elements.

To prevent a forgery or imitation of security elements for example with high-quality color photocopiers, security elements frequently have optically variable elements which convey a different pictorial impression to the viewer from different viewing angles, showing e.g. a different color impression or also different graphical motifs. In this connection, it is known for example to employ diffractive optical micro- or nanostructures in the form of embossed holograms or other hologram-like diffractive structures.

For producing optically variable elements it is further known to employ microlens arrays. For example, EP 0 219 012 A2 discloses a regular array of parallel, mutually abutting cylindrical lenses which shows only a strip-shaped region below each cylindrical lens in dependence on the viewing direction because of the converging effect of the cylindrical lenses. Below the cylindrical lenses there are arranged images broken down in a strip shape which combine to form a certain overall image for a viewer according to the viewing direction. According to the viewing angle, different images become visible upon horizontal arrangement of the cylindrical lenses, thereby making it possible to produce tilt images and animations. When the cylindrical lenses are in the vertical direction, stereoscopic parallaxes can be incorporated in the image, thereby making it possible to produce a three-dimensional impression for the viewer.

Besides employing cylindrical lenses, it is known also to employ a regular array of spherical lenses as is employed for example in a moiré magnification arrangement.

U.S. Pat. No. 5,712,731 A relates to the employment of such a moiré magnification arrangement as a security feature. The security apparatus described therein has a regular arrangement of substantially identical printed micro-images, as well as a regular two-dimensional arrangement of substantially identical spherical microlenses. The microlens array has substantially the same pitch as the micro image array. When the micro-image array is viewed through the microlens array, one or several magnified versions of the micro-images are produced for the viewer in the regions where the two arrays are substantially in register.

The basic mode of function of such moiré magnification arrangements is described in the article "The moiré magnifier", M. C. Hutley, R. Hunt, R. F. Stevens and P. Savander, Pure Appl. Opt. 3 (1994), pp. 133-142. Very briefly, moiré magnification accordingly designates a phenomenon occurring upon the viewing of a grid of identical image objects through a lenticular grid with approximately the same grid measure. As with any pair of similar grids, this results in a moiré pattern which appears in this case as a magnified and optionally rotated image of the repeated elements of the image grid. Further configuration variants and effects that are based on this mechanism are described for example in the article "Properties of moiré magnifiers", Kamal et al., Optical Engineering 37 (11), pp. 3007-3014 (November 1998).

Regular microlens arrays can also be employed as verification means for security elements, as is described in EP 1 147 912 B1. Here, certain structures of a security element become visible to the user only upon viewing through such a verification element, so that the function of the security element can be hidden to a casual viewer.

For producing such microlens arrays there are different technologies known in the prior art. In EP 1 878 584 A2 there is disclosed for this purpose the printing of an optical lacquer on a carrier substrate by means of a gravure printing plate. The gravure printing plate has depressions made therein which constitute the negative form of the desired lens array. Further, this print also discloses the employment of the gravure printing plates as an embossing tool by means of which the desired microlens array is formed for example into a lamination layer. Such methods are also described in EP 0 698 256 B2, there being disclosed therein alternatively also the employment of photoresist layers in connection with suitable masks for producing microlenses.

In DE 10 2006 003 798 A1 there is stated, as a further alternative, the partial application of a primer layer which produces a change in surface tension in certain regions, which can be employed for producing the microlenses.

From the last-mentioned print, and also from WO 2006/016265 A1, there is known, as a further alternative, an ink jet method wherein a translucent plastic, for example an optical lacquer, is positioned at the desired places in the form of micro droplets by means of an ink jet printing head on a rough surface. In this method, the employed materials must have suitable surface tensions in order to avoid a flow-out of the applied liquid micro droplets.

Microlens arrays are usually disposed on foil elements such as foil strips, which are applied to the security paper by means of adhesive bonding. Such security foils are expensive; further, the machines that are required for applying the security foils to the security paper are not present in every paper mill or printing plant. Furthermore, individually constructed security elements based on microlens arrays would be desirable.

Proceeding from this, the invention is based on the object of avoiding the disadvantages of the prior art and, in particular, of making available a microlens substrate that can also be used as a verification means or security feature for a data carrier and which is simply structured, as well as a method for manufacturing the microlens substrate.

This object is achieved by the combinations of features defined in the independent claims. Further developments of the invention are the subject matter of the dependent claims.

SUMMARY OF THE INVENTION 1. (First aspect of the invention) A lens pigment, suitable for the manufacture by printing technology of value documents, comprising:
   a carrier substrate forming a lens base, which is supplied on its front side with a first plastic having at least one elevation that produces a microlens; and
   a second plastic leveling the first plastic.

2. (Preferred embodiment) The lens pigment according to clause 1, wherein the first plastic has a plurality of elevations each producing a microlens, wherein the plurality preferably is an integer in a range from 1 to 12, further preferably in a range from 1 to 9 and particularly preferably in a range from 1 to 7.

3. (Preferred embodiment) The lens pigment according to clause 1 or 2, wherein the lens pigment has a substantially mirror-symmetrical structure, so that the carrier substrate is supplied both on its front side and on its back side with a first plastic having at least one elevation that produces a microlens, and a second plastic leveling the first plastic.

4. (Preferred embodiment) The lens pigment according to any of clauses 1 to 3, the carrier substrate forming a lens base is supplied on its front side and/or on its back side with (e.g. a number corresponding to the number of microlenses of) microscopic structures, wherein the microscopic structures are recognizable for the viewer in the form of characters, patterns or codings as a result of the focusing effect of the microlenses.

5. (Preferred embodiment) The lens pigment according to clause 4, wherein the microscopic structures are microscopic structures produced by printing technology or microscopic structures produced by means of embossing.

6. (Preferred embodiment) The lens pigment according to any of clauses 1 to 3, wherein the front and/or the back of the carrier substrate forming a lens base, which is supplied with the first plastic and optionally with microscopic structures, has an opaque layer, preferably a metallic layer or a printing layer.

7. (Preferred embodiment) The lens pigment according to clause 6, wherein the opaque layer is formed by a thin-film element, wherein the thin-film element preferably is a color-shifting thin-film element, in particular with a structure having a reflector layer, a dielectric spacer layer and an absorber layer.

8. (Preferred embodiment) The lens pigment according to either one of clauses 4 or 5, wherein the microlenses are arranged in the form of a first grid and the microscopic structures are arranged in the form of a second grid, wherein the grid width of the first and the second grid lies in a range from 3 µm to 50 µm, preferably in a range from 5 µm to 35 µm and particularly preferably in a range from 10 µm to 20 µm.

9. (Preferred embodiment) The lens pigment according to any of clauses 1 to 8, wherein the second plastic has a refractive index which differs from the refractive index of the first plastic by at least 0.3.

10. (Preferred embodiment) The lens pigment according to any of clauses 1 to 8, wherein the carrier substrate forming a lens base has a round shape, in particular has a circular or elliptical shape, or the shape of a polygon, in particular a square, rectangular, triangular, pentagonal or hexagonal shape.

11. (Preferred embodiment) The lens pigment according to any of clauses 1 to 10, wherein the carrier substrate forming a lens base additionally has a magnetic layer.

12. (Second aspect of the invention) A method for manufacturing the lens pigment according to any of clauses 1 to 11, comprising:
   making available a carrier substrate;
   supplying the carrier substrate with a first plastic;
   structuring the first plastic in order to form elevations in this manner, each of which produces a microlens;
   applying a second plastic leveling the first plastic;
   breaking up the layer structure produced in the preceding steps into a multiplicity of lens pigments.

13. (Preferred embodiment) The method according to clause 12, wherein the structuring of the first plastic takes place by means of embossing.

14. (Third aspect of the invention) A value document, in particular a banknote, which is printed with lens pigments according to any of clauses 1 to 11.

15. (Preferred embodiment) The value document according to clause 14, wherein the lens pigments are arranged in a window region of the value document.

16. (Fourth aspect of the invention) A printing ink comprising lens pigments according to any one of clauses 1 to 11.

DETAILED DESCRIPTION OF THE PREFERRED EMBODIMENTS

The lens pigment according to the invention, which can be applied to a value document substrate by means of conventional printing techniques, comprises a carrier substrate which forms a lens base and which is supplied on its front side with a first plastic having at least one elevation that produces a microlens, and a second plastic leveling the first plastic. The lens pigment according to the invention permits a cost-effective manufacture of security elements based on microlenses for securing value documents. Supplying value documents with the lens pigment according to the invention can also be carried out in any printing plant without the need for special machines for applying security foils to security paper. The application by printing technology of the lens pigment according to the invention to the data carrier substrate additionally permits a wide freedom of design and thus increased forgery resistance. Further, individual value documents, in particular banknotes, can be made available in an individualized form by means of individual printing with lens pigments.

Suitable plastics for the manufacture of the first plastic having at least one elevation that produces a microlens, and the second plastic leveling the first plastic, are known in the prior art, see e.g. WO 2008/098753 A1 and the radiation-curing compound systems described therein. Suitable dimensions within microlens arrays with focusing elements, namely microlenses, in the form of a first grid and microscopic structures in the form of a second grid, wherein the microscopic structures when viewed through the focusing elements can be seen in magnification, are described e.g. in WO 2006/087138 A1.

The lens pigment according to the invention is preferably constituted in such a manner that the first plastic has a plurality of elevations each producing a microlens, wherein the plurality is an integer in a range from 1 to 12, further preferably in a range from 1 to 9 and particularly preferably in a range from 1 to 7.

The lens pigment according to the invention can in particular have a substantially mirror-symmetrical structure, so that the carrier substrate is supplied both on its front side and on its back side with a first plastic having at least one elevation that produces a microlens, and a second plastic leveling the first plastic.

The lens pigment according to the invention is preferably constituted in such a manner that the carrier substrate forming a lens base is supplied on its front side and/or its back side with (e.g. a number corresponding to the number of microlenses of) microscopic structures, wherein the microscopic structures are recognizable for the viewer in the form of characters, patterns or codings as a result of the focusing effect of the microlenses. The microscopic structures can be present in particular in the form of micro-characters or micro-patterns. The microscopic structures can in particular be produced by printing technology, e.g. by means of micro printing. The microscopic structures can also be present in the form of a metallization and can be produced e.g. by means of adhesive transfer starting from a metal donation foil or starting from a full-area metallization by structuring by means of a washing process or by means of laser demetallization. Washing methods are known in the prior art, see e.g. EP 1 972 462 A2 and the prior art cited therein.

In the case of microscopic structures produced by printing technology, single-colored or multicolored microscopic structures can be present. In this manner, micro-images can be produced which, when viewed perpendicularly in incident light, e.g. appear white and when viewed obliquely (e.g. when tilting the value document printed with the lens pigments, e.g. a banknote) appear colored.

In the case of microscopic structures that are present in the form of a metallization, in particular the later individualization of value documents by means of laser radiation is possible. The laser radiation leads to demetallization, so that characters, patterns or codings can be introduced in the regions of the value document, e.g. a banknote, printed with the lens pigments.

In an alternative embodiment, the microscopic structures can be present in the form of embossed microstructures. Different methods are applied to produce the elevations that each form a microlens and the embossed microstructures. In particular, with the aid of techniques of classic semiconductor technology (photo lithography, electron beam lithography, laser lithography, laser ablation), suitable structures in resist materials can be exposed, possibly refined, electroplated and employed for making embossing tools for foil embossing. Known methods for embossing into thermoplastic foils or into foils coated with radiation-curing lacquers are particularly suitable for manufacturing large areas. Alternatively, techniques are also known for applying microlens systems by ink jet printing methods or by self-organization processes of micro-particles on surfaces.

The embossed microstructures advantageously comprise elements that are in the form of spherical or aspherical domes, cones, triangular pyramids, trapezoidal pyramids, truncated cones, truncated pyramids or the like, and/or have a base area in the form of characters, patterns or codings. The microlenses and optionally the embossed microstructures preferably possess circular or elliptical base areas.

In a further development of the invention, the embossed microstructures are embossed into a dyed embossing lacquer, preferably a dyed opaque or a translucently dyed embossing lacquer. The dyed embossing lacquer is advantageously a radiation-curing lacquer containing color pigments. The embossed microstructures can also be arranged on a carrier substrate which is dyed or supplied with an additional ink layer. According to a preferred variant, the embossed microstructures can also be supplied with an opaque coating, preferably a metal layer or an opaque ink layer.

In an advantageous development of the lens pigment according to the invention, the microlenses and the microscopic structures are arranged relative to one another in such a manner that a visually recognizable 2D/3D effect is created. The microscopic structures comprise expediently embossed microstructures that are coated with a reflective layer, preferably a metal layer. To increase the protection against forgery, it is useful to provide recesses in the reflective layer in the form of characters, patterns or codings or to configure the reflective layer in the form of characters, patterns or codings.

In the lens pigment according to the invention the microlenses and optionally also the microscopic structures are arranged on a carrier substrate. A spacer layer and/or adhesive layer can be provided in order to align the microlenses and the optionally present microscopic structures with respect to one another with regard to a suitable spacing matched to the focal length of the microlens.

The lens pigment according to the invention is preferably constituted such that the microlenses are arranged in the form of a first grid and the microscopic structures are arranged in the form of a second grid, wherein the grid width of the first and second grid lies in a range from 3 µm to 50 µm, preferably in a range from 5 µm to 35 µm and particularly preferably in a range from 10 µm to 20 µm.

The microlenses can in particular be present as transmissive, refractive or diffractive lenses or as a mixed form thereof.

With reference to the refractive index of the first plastic and the refractive index of the second plastic, there is preferably a sufficiently large difference to achieve a particularly advantageous lens effect. Since lenses are typically made from lacquers with a refractive index from 1.2 to 1.5, the effect of the lenses is strong when the layer adjoining the lenses is made available with e.g. a refractive index of 1. However, exposed lenses have the disadvantage that, on the one hand, they can be easily molded and, on the other hand, they can suffer from the effects of dirt, chemicals or mechanical influences in the circulation of the object of value supplied with the security element. It is therefore advantageous to embed the lenses. For this purpose, with reference to the second plastic, in particular highly refractive protective layers can be employed which have refractive indices which differ by at least 0.3 from the refractive index of the lenses, i.e. the first plastic. For this purpose, e.g. lacquers are useful which are filled with nanoparticles (e.g. of titanium oxide, aluminum oxide, zinc oxide or zinc sulfide). Such systems and similar ones with refractive indices e.g. between 1.7 and 2 are commercially available. Highly refractive plastics are also described in WO 2008/098753 A1. The plastics described therein are based in particular on UV-curing compound systems and typically contain elements such as sulfur, chlorine, bromine or iodine. Lowly refractive plastics, on the other hand, advantageously contain fluorine. Lowly refractive plastics can e.g. also have $MgF_2$ nanoparticles.

In a preferred embodiment, the lens-shaped elements are at least partially supplied with a reflective layer and thus act as a kind of concave mirror.

In order to permit an automatic authenticity check and optionally further sensory detection and processing of the objects of value printed with the lens pigments according to the invention, the lens pigment according to the invention preferably comprises a machine-readable layer. The machine-readable layer advantageously contains machine-readable feature substances, in particular reflective, magnetic, electrically conductive, polarizing, phase-shifting or luminescent, especially phosphorescent or fluorescent substances.

The lens pigment according to the invention is preferably constituted such that the front side and/or the back of the carrier substrate forming a lens base, which is supplied with the first plastic and optionally with microscopic structures, has an opaque layer, preferably a metallic layer or a printing layer. The opaque layer can be formed, in particular, by a thin-film element, wherein the thin-film element is preferably a color-shifting thin-film element, in particular with a structure having a reflector layer (e.g. an Al layer), a dielectric spacer layer (e.g. a $SiO_2$ layer) and an absorber layer (e.g. a Cr layer).

The presence of the opaque layer permits in particular a later individualization of the value documents printed with the lens pigments by means of laser radiation. The laser radiation leads to the production of characters, patterns or codings within the opaque layer.

The lens pigment according to the invention is preferably constituted such that the carrier substrate forming a lens base has a round shape, in particular a circular or elliptical shape, or the shape of a polygon, in particular a square, rectangular, triangular, pentagonal or hexagonal shape.

The carrier substrate forming a lens base can be present, for example, in the form of a UV-curing lacquer or in the form of a carrier foil, e.g. a PET foil. In the case of a foil, the brittleness can optionally be increased by adding fillers or by means of ionizing radiation to facilitate the comminution of the initial multilayer body into individual pigments during the manufacture.

It is preferred that the carrier substrate forming a lens base additionally has a magnetic layer. In this manner, magnetically orientable pigments can be made available, so that, in accordance with the orientation of the individual lens pigments achieved by means of a magnet, impressive viewing angle-dependent optical properties of the data carrier printed with the lens pigments can be achieved.

The present invention further comprises a method for manufacturing the lens pigment according to the invention, comprising:
  making available a carrier substrate;
  supplying the carrier substrate with a first plastic;
  structuring the first plastic in order to form elevations in this manner, each of which produces a microlens;
  applying a second plastic leveling the first plastic;
  breaking up the layer structure produced in the preceding steps into a multiplicity of lens pigments.

The structuring of the first plastic is preferably carried out by means of embossing.

The present invention further comprises a value document, in particular a banknote, which is printed with lens pigments according to the invention. The value document substrate is in particular a paper substrate, a paper-like substrate, a polymer substrate, a paper/foil/paper composite substrate or a foil/paper/foil composite substrate.

The lens pigments are preferably arranged in a window region of the value document. The window region can e.g. be formed by a foil element that is arranged in the region of a recess in the opaque value document substrate, e.g. formed from paper. In the case of a value document based on a transparent polymer substrate, a window region e.g. can be produced by means of congruent recesses in the opaque printing layers applied to the front side and back side of the polymer substrate.

A preferred method for manufacturing the pigments according to the invention comprises the following steps of:
  creating a pigment layer on a starting substrate;
  detaching from the starting substrate; and
  structuring the pigment layer into a multiplicity of pigments.

The term "pigment layer" means in particular the layer sequence forming the pigment, comprising at least the carrier substrate forming a lens base, which is supplied on its front side with a first plastic having at least one elevation that produces a microlens, and a second plastic leveling the first plastic.

In the present case, the pigment layer is brought into contact with an intermediate substrate in a suitable manner. The pigment layer adheres to the intermediate substrate at least in sections. Thereafter, the intermediate substrate and the starting substrate are separated from one another again.

In particular, the predetermined contour of the pigment can comprise an outer contour (outline of the pigment). The outer contour of the pigment limits the pigment. The predetermined contour of the pigment can also have an inner contour. The inner contour of the pigment delimits an opening in the pigment. The process permits to provide pigments with a more complex outer contour than the conventional breaking of the pigment layer. In addition, pigments with an inner contour, i.e. with a circumferential breaking edge which delimits an opening within the pigment, can be manufactured by breaking.

Through the contact with the intermediate substrate the pigments (resp. pigment sections of the pigment layer) are protected against breaking for the step of detaching and/or structuring.

The pigment layer is preferably structured into the multiplicity of pigments by the step of separating the intermediate substrate and the starting substrate. Upon separating, the pigment layer breaks into the multiplicity of pigments with a predetermined contour.

According to the preferred method, preferably at least 2,000 pigments, particularly preferably at least 5,000 pigments and further preferably more than 10,000 pigments, are simultaneously structured (or broken out) from the pigment layer in the separating step. This number is preferably structured simultaneously along a dividing line.

In particular, the pigment layer comprises pigment sections and residual sections. The pigment sections have the contour of the pigments. The pigment sections are spaced apart, in particular by the residual section. The residual sections have a contour that is inverse to that of the pigment sections. Optionally, the residual sections can be connected to one another. In the separating step, the pigment layer breaks and either the pigment layer sections or the residual sections are detached from the starting substrate. The other sections in each case—i.e. the residual sections or the pigment layer sections, respectively—lie on the starting substrate also after separating.

According to the preferred method, pigments with the predetermined contour can be manufactured in high purity. The degree of purity can be given in percent by weight. The pigments with a predetermined contour form more than 90%, preferably more than 95%, of the mass by weight comprising the pigments and impurities, which are formed in particular by fragments of the pigment layer and only to a small degree by pigments with a damaged contour. Contamination with fragments is avoided in particular, since the residual sections of the pigment layer (or the pigment sections) adhere to the starting substrate.

In the preferred embodiment, the pigments (or the pigment layer sections of the pigment layer) are detached from the starting substrate by the step of separating. The pigments are transferred from the starting substrate to the intermediate substrate and are protected by the intermediate substrate at the time of breaking. The pigments are subsequently detached from the intermediate substrate.

In a different embodiment, the multiplicity of pigments (or the pigment layer sections of the pigment layer) continues to be present on the starting substrate after separating. The pigments are subsequently detached from the starting substrate. In the separating step, the pigment layer breaks and the residual sections are detached from the starting substrate.

Merely as an alternative to the aforementioned embodiments, the pigment layer is structured already before the step of separating. In the step of separating, either the pigment layer sections or the residual sections of the already structured pigment layer are detached from the starting substrate. The pigments are protected by the intermediate substrate (and the starting substrate) at the time of detaching.

A relief structure, which defines the contour of the pigments, can expediently be created in the starting substrate and/or the intermediate substrate. The relief structure comprises in particular elevated sections in which the pigment layer comes into contact with an adhesive layer (of the other substrate in each case) and adheres, and recessed sections with which contact of the pigment layer with this adhesive layer is avoided. Either the depressions or the elevations are provided with the contour of the pigments. The relief structure can be created by embossing, lasering or etching. Since the relief structure (and/or an adhesion structure explained in the following) does not yet lead to individual pigments, this is also referred to here as pre-structuring. The height of the relief structure is preferably greater than the height of the pigment layer. In particular, the height of the relief structure (difference between the planar elevations and depressions) is adapted to the height of the pigment layer and/or the adhesive layer, in particular its height and viscosity. The adaptation has the effect that the pigment layer selectively adheres to the intermediate substrate only in the elevated sections (or adheres more strongly than to the starting substrate). The structuring of the pigment layer into individual pigments takes place by breaking the pigment layer with the contours defined by the pre-structuring and predetermined for the pigments.

The starting substrate can be supplied with the relief structure—preferably before, but alternatively also after the creation of the pigment layer on the starting substrate. The relief structure can in particular be created by embossing, preferably by embossing into a curable (lacquer) layer, which is cured after the embossing, for example by means of UV light. In the starting substrate without a pigment layer, the relief structure can alternatively also be created by etching or lasering. Corresponding to the relief structure, the pigment layer on the pre-structured starting substrate comprises pigment sections and residual sections. After being brought into contact with the intermediate substrate, the elevated sections adhere to the adhesive layer of the intermediate substrate. The pigment sections are preferably the elevated sections which—are stabilized by the adhesion to the intermediate substrate and—break from the pigment layer when the substrates are separated, adhere to the intermediate substrate and detach from the starting substrate.

If the intermediate substrate is supplied with the relief structure, analogously elevated or recessed sections of the adhesive layer of the intermediate substrate are created. In a first alternative, the intermediate substrate is supplied with the relief structure and subsequently coated with the adhesive layer. The relief structure is preferably embossed, in particular embossed into an embossing lacquer layer of the intermediate substrate. In a second alternative, the intermediate substrate is pre-structured together with the adhesive layer, i.e., for example, embossed. Again, either the pigment sections or the residual sections detach themselves from the starting substrate, since they adhere to the adhesive layer of the intermediate substrate.

Instead of—or optionally in addition to—the relief structure, an adhesive structure can serve as a pre-structuring. On the pigment layer, the starting substrate and/or the intermediate substrate, an adhesive structure is created which predetermines the contour of the pigments. Either an adhesion-promoting adhesive structure or an adhesion-preventing anti-adhesion structure can serve as such a pre-structuring. For example, the adhesive layer of the starting substrate could be pre-structured, in particular by selective removal or deactivation by means of a laser or by selective anti-adhesive printing. In accordance with the pre-structuring, in tur pigments, i.e. the pigment sections of the pigment layer, preferably adhere to the intermediate substrate and detach from the starting substrate.

The intermediate substrate comprises at least one intermediate substrate layer. As a rule, the intermediate substrate comprises the intermediate substrate layer and an adhesive layer. The adhesive layer of the intermediate substrate is configured in such a manner that the pigment layer adheres more strongly to the adhesive layer of the intermediate substrate than to the starting substrate (or its adhesive or anti-adhesive layer). The starting substrate comprises at least one starting substrate layer. As a rule, the starting substrate comprises the starting substrate layer and an adhesive or anti-adhesive layer. The adhesive layer of the starting substrate can be formed by a lacquer. The starting substrate layer preferably comprises a foil—in particular a plastic foil such as PET foil—and a cured embossing lacquer layer. The starting substrate layer and/or the intermediate substrate layer is preferably present in the form of a (foil) web with a minimum width of 20 cm, in particular 50 cm and particularly preferably 100 cm. The foil web can have a width of 200 cm. The web has a minimum length of 10 meters, preferably 100 meters. It can be made available on a roll.

The pigment layer comprises several partial layers, which in turn optionally can be formed from sub-layers. The pigment layer comprises in particular a carrier substrate which forms a lens base and which is supplied on its front side with a first plastic having at least one elevation that produces a microlens, and a second plastic leveling the first plastic. The carrier substrate is in particular a layer of increased stability (which is also called "carrier layer" below) and can in particular be formed by a cured lacquer.

The pigment can contain an additional motif which is preferably arranged in register with the contour of the pigment and/or has a contour independent of the pigment contour. The registered arrangement can in particular be achieved without additional effort if the additional motif is at least partially created as well in the step of creating the relief structure. For example, with an embossing of the starting substrate, both the relief and an optically effective relief structure of the additional motif can be introduced. A contour of the additional motif can follow the (outer or inner) contour of the pigment at a fixed distance. The additional motif can be formed by the surface structure. The surface structure has a smaller depth modulation, for example from 3 nm to about 500 nm, than the contour-determining portion of the relief structure. The additional motif can have sub-wavelength structures, such as moth-eye structures, and/or diffractive structures, such as holographic grids, the latter having typical periods between 500 nm and 1.5 µm. In particular, the additional motif can contain micro mirrors. The shape of these can be determined by the embossing and can be coated reflectively (metal or HRI layer). Alternatively, the contour of the additional motif is independent of the contour of the pigment and can thus be freely selected. For example, a continuous partial layer of the pigment layer can be created, which breaks along the pigment contour, and an additional, non-continuous, partial layer of the pigment layer can be created, which, for example, represents the additional motif.

The pigments resulting from the pigment layer can be referred to as areal pigments or platelet-shaped pigments. The outer contour can have almost any desired shape, as long as the pigment has sufficient stability for further processing. The inner contour, i.e. openings, can also be selected with any desired size and geometry.

It goes without saying that (the) pigments are provided for printing the pigments. The pigments—in particular detached from the starting and/or the intermediate substrate—are processed into a printing ink. A printing ink with the pigments is printed. The printing is preferably carried out as screen printing, in particular by means of zonal coating with a doctor knife. Alternatively, the pigment can be printed by means of gravure printing and optionally by means of flexographic printing. The printing ink comprises the pigments and at least one solvent and optionally a binder. In particular, if the pigments produced have a pigment size of less than 15 µm, preferably less than 10 µm, the printing ink can be employed in an offset printing method.

In comparison to other manufacturing processes, pigments with increased complexity can be achieved in the present case, even with a smaller size and thickness, in particular with consistently high reliability. The pigment has a size or lateral dimension of less than 100 µm, in particular less than 50 µm, particularly preferably less than 30 µm. The currently achievable pigment sizes start at a few 100 nm. Foreseeably, pigments with sizes between 100 nm and 100 µm, preferably between 200 nm and 50 µm, particularly preferably between 200 nm (or 2 µm) and 30 µm, are possible. The thickness of the pigments lies in the range from 30 nm to 4 µm (or up to 2 µm), preferably between 100 nm and 1 µm.

The outer contour of the pigment can in particular deviate from a regular outer contour. All basic shapes from the simple polygon (with 3 to n corners) including a circle are regarded as regular outer contours. Bulges or indentations that deviate from the regular basic shape have e.g. the following typical sizes: 100 nm to 30 µm, preferably 300 nm to 10 µm and particularly preferably 500 nm to 5 µm. Deviations from a regular outer contour form weak points in the pigment. The pigment will thus—without applying the present preferred method—break faster at its weak point within the pigment than at its outer contour. With reference to the pigment size, the maximum size of the pigment in one direction, the at least one indentation reduces the pigment at a weak point to e.g. 5% to 66%, or 5% to 49% of the pigment size. The pigment thus has left only e.g. 5% to 66%, preferably 5% to 49%, particularly preferably between 5 and 24%, of the pigment size at its narrowest point. Analogously, bulges form correspondingly narrow points (weak points) in the pigment with reference to the pigment size. Bulges (and/or indentations) form a narrow point in the pigment, which lies at a distance from the outer contour of e.g. more than 3%, preferably more than 6%, particularly preferably more than 12% of the pigment size. The minimum length of the bulge (measured from the pigment center or balance point to the outer contour) correspondingly amounts to e.g. 3% (6% or 12%) of the pigment size. The bulge's width at the narrow point is e.g. only 1% to 33%, preferably 1% to 15%, particularly preferably 1% to 5% of the pigment size. At the narrow point the bulge has an opening angle, formed by the edges of the bulge, of e.g. less than 60 degrees, preferably less than 45 degrees, particularly preferably less than 30 degrees. The opening angle at the narrow point can be zero, for example in the case of a rectangular bulge (with parallel edges) or negative, for example in the case of an outwardly widening bulge.

A predetermined, optionally present inner contour (opening in the pigment) of the pigment can represent the predetermined contour or complement the predetermined outer contour of the pigment. The opening can be constructed e.g. as a regular polygon (triangle, quadrangle, . . . , n-gon), circle, oval, irregular polygon (such as trapezoid), symbol (with corners and curves) or text. The opening preferably follows the outer contour (partially or completely) and/or the opening follows an additional information item on the pigment.

The optionally present inner contour has e.g. a size of at least 100 nm. Between the optionally present inner contour and the outer contour, the pigment preferably has a minimum width of 300 nm, in particular 500 nm or 1 µm, in particular a width of 300 nm to 10 µm, particularly preferably 500 nm to 5 µm. With reference to the pigment size, the pigment at its narrowest point between the outer contour and the optionally present inner contour preferably has a width of less than 66%, preferably less than 30%, particularly preferably less than 10%, of the pigment size.

As a rule, pigments are manufactured with an identical contour. In an advantageous embodiment, pigments with two (or three or more than three) different predetermined contours are manufactured simultaneously from one pigment layer. In further developments, the simultaneously manufactured pigments comprise (at least) one uniform, predetermined outer contour and optionally at least two different inner contours for the uniform, predetermined outer contour or (at least) one uniform, predetermined, optionally present inner contour and several different outer contours for the uniform, predetermined, optionally present inner contour. For example, the uniform outer contour can represent a first (supra-) national symbol and the optionally present inner contour can represent regional (or correspondingly national) symbols.

A metal layer, for example of aluminum, chromium, copper, iron, nickel, cobalt, silver, gold or alloys of the aforementioned metals, can be employed as an optionally present optical effect layer of the pigment. The thickness of the metal layer is in particular between 2 nm and 200 nm, preferably between 10 nm and 50 nm, particularly preferably between 15 nm and 30 nm.

The optical effect layer can be configured as a reflective or semitransparent layer; instead of a metal layer, a highly refractive layer (HRI layer) can be provided. The pigment preferably comprises a three-layer structure which can be constructed as a color-shifting and/or color-filtering structure. The pigment can be formed by the three-layer structure, or comprise the three-layer structure as a supporting partial layer or as an optically active partial layer. The three-layer structures are preferably composed of a semitransparent metal layer, a dielectric and a reflective (or semitransparent) metal layer. SiO2, ZnS, MgF2 or TiO2, for example, are employed as dielectrics.

At least the optically active partial layers of the pigment are particularly preferably provided symmetrically to the pigment plane. An orientation of the pigment after the printing process is therefore irrelevant. For example, the pigment can be formed by two identical semitransparent partial layers with a supporting spacer layer. Such pigments preferably have a metallic luster with a certain color spectrum when viewed from above, while, when viewed in transmission, they show a spectrum complementary to this color spectrum, particularly preferably gold from above and blue when viewed in transmission. In a different variant, a dielectric and a semitransparent layer respectively are provided symmetrically around a jointly used reflective layer (above and below).

To render the pigments influenceable by a magnetic field with respect to their orientation, a magnetic layer can be employed, which can be formed, for example, from the metals iron, nickel, cobalt or alloys which contain these metals. Such alloys preferably contain further elements such as Si, Nd, B, Gd, Sm, Sr, Ba or Mn. The magnetic layer is advantageously disposed on the inside of the pigments. In a particularly advantageous variant, the magnetic partial layer is provided between two reflective partial layers, for example of aluminum. The pigments particularly preferably have a central magnetic layer which is supplied with a three-layer structure on both sides (symmetrically), i.e. in particular comprises on both sides—from the inside to the outside—a reflective layer (preferably a reflective metallic layer), a spacer layer (preferably a dielectric layer) and an absorber layer (preferably a semitransparent metallic layer).

According to the present, preferred method, pigments can be created with
- a breaking edge delimiting the pigment, which represents a breaking force which is greater than a corresponding breaking force for the pigment, and/or
- an inner breaking edge which delimits an opening in the pigment.

The breaking force of the pigment is determined by its narrowest point. The pigment can thus more easily have in its outer contour at least an acute angle with an angle e.g. of less than 45 degrees, preferably less than 30 degrees, or have an outer contour that tapers towards the pigment center. Such outer contours have hitherto been problematic and conceivable at most with greatly increased effort, such as predetermined breaking points which used to be very thin compared to the thickness of the pigment layer. The breaking force of the pigment presently is smaller by e.g. at least a factor of 1.1, preferably 1.5, particularly preferably a factor of 2, than the breaking force of the breaking edge. The breaking force of the breaking edge can be determined proceeding from a breaking force of the pigment layer (measured value) on the basis of the breaking edge (surface) area and the contour (computation). A breaking force is determined or measured as the maximum force that can be applied until the object to be measured breaks. In the present case, the pigment is preferably loaded at two points, each of which is at a predetermined distance from a support point or a support line of the pigment. At least approximately, the ratio of the breaking forces corresponds to the ratio of the breaking surfaces. The pigment cross-sectional area at the narrowest point of the pigment, i.e. in particular the width of the weak point of the pigment times the height of the pigment layer, can in the present case be smaller than the surface of the breaking edge of the pigment on its outer contour, i.e. in particular the length of the breaking edge times the height of the breaking edge.

The inner breaking edge is formed by the optionally present inner contour of the pigment. The breaking edge delimiting the pigment forms the outer contour of the pigment.

A printing ink containing the lens pigments according to the invention can contain the lens pigments in particular in encapsulated form. In this manner, in particular, spherical micro-capsule pigments can be produced in which the radius of the sphere is further preferably only slightly larger than the radius of the lens pigment. Further, several lens pigments can also be present in encapsulated form in a single spherical micro-capsule. The material employed for encapsulation can in particular be hydrophobic or hydrophilic. If a liquid carrier medium is employed inside the micro-capsule, the lens pigments can in this manner be made available in a freely rotatable, in particular freely magnetically alignable manner. Micro-capsules containing magnetically alignable pigments in particular are known in the art, see, e.g. WO 2012/130370 A1.

BRIEF DESCRIPTION OF THE DRAWINGS

Further embodiment examples as well as advantages of the invention will be explained hereinafter with reference to the figures, in whose representation a rendition that is true to scale and to proportion has been dispensed with in order to increase the clearness.

There are shown:

FIG. 1 two lens pigments according to the invention in a cross-sectional view;

FIG. 2 a further lens pigment according to the invention in cross-sectional view;

FIG. 3a a further lens pigment according to the invention in an oblique view;

FIG. 3b a further lens pigment according to the invention in plan view;

FIG. 3c a further lens pigment according to the invention in plan view;

FIG. 3d a further lens pigment according to the invention in plan view;

FIG. 4 a further lens pigment according to the invention in an oblique view;

FIG. 5a a further lens pigment according to the invention in plan view;

FIG. 5b a further lens pigment according to the invention in plan view;

FIG. 5c a further lens pigment according to the invention in plan view;

FIG. 6 an example of a detail from a layer structure in a cross-sectional view for the manufacture of a lens pigment according to the invention;

FIG. 7 a further example of a detail from a layer structure in a cross-sectional view for the manufacture of a lens pigment according to the invention;

DETAILED DESCRIPTION OF VARIOUS EMBODIMENTS

Figure 8:
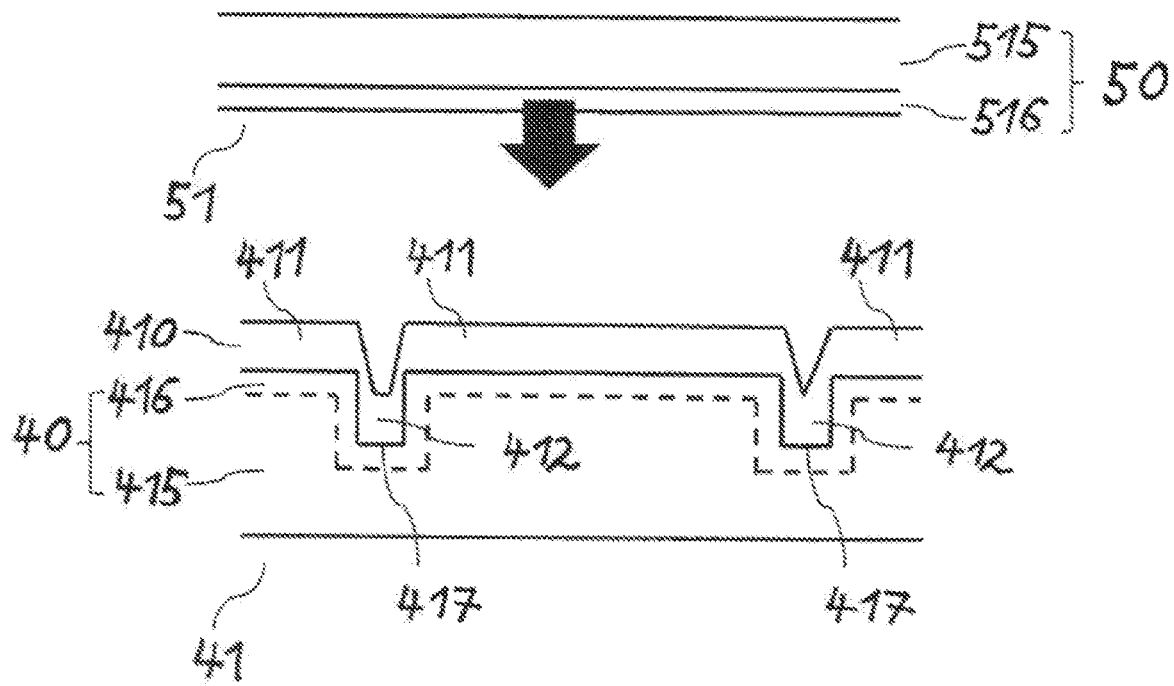
FIG. 8, 9 a preferred method for manufacturing the lens pigment according to the invention in accordance with an exemplary embodiment.

On the left-hand side, FIG. 1 shows a lens pigment 1 according to the invention in a cross-sectional view. The lens pigment 1 comprises a carrier substrate 2, in the example a carrier foil, which is supplied with a first plastic 3 on its front side. The plastic 3 is formed in the form of an elevation that produces a microlens. The plastic 3 is leveled by a second plastic 4. The carrier substrate 2 additionally has a microscopic structure 5 produced by printing technology, which in the present example is formed in the form of a character. The second plastic 4 has a refractive index which differs from the refractive index of the first plastic 3 by at least 0.3.

FIG. 1 shows on the right-hand side a further lens pigment 6 according to the invention in a cross-sectional view. The lens pigment 6 is based on the lens pigment 1 with regard to the materials used, but has a substantially mirror-symmetrical structure, so that the carrier substrate 7 is supplied on both its front side and its back side with a first plastic 8 having at least one elevation that produces a microlens and a second plastic 9 leveling the first plastic. An orientation of the pigment 6 after the printing process is therefore irrelevant, provided that the plane of the carrier substrate 7 is disposed parallel to the plane of the value document substrate, e.g. a banknote, printed with the lens pigment 6. The carrier substrate 7 additionally has a microscopic structure 10 produced by printing technology, which in the present example is formed in the form of a character.

FIG. 2 shows a further lens pigment 11 according to the invention in a cross-sectional view. The lens pigment 11 comprises a carrier substrate 12, in the example a carrier foil, which is initially supplied on its front side with an opaque metallic layer 13, in the example an Al layer, and above the metallic layer 13 with a first plastic 14. The plastic 14 is formed in the form of an elevation that produces a microlens. The plastic 14 is leveled by a second plastic 15. The metallic layer 13 additionally has on its upper side a microscopic structure 16 produced by printing technology, which, in the present example, is formed in the form of a character. The second plastic 15 has a refractive index which differs from the refractive index of the first plastic 14 by at least 0.3. The carrier substrate 12 has on its lower side a magnetic layer 17 and a further opaque metallic layer 18, in the example an Al layer. The magnetic layer 17 is suitable to render the lens pigment 11 influenceable by a magnetic field with respect to its orientation.

FIG. 3a shows a further lens pigment 19 according to the invention in an oblique view. The lens pigment 19 is based on a carrier substrate 20 which is supplied with a first plastic 21 on its front side. The plastic 21 is formed in the form of an elevation that produces a microlens and is leveled by a second plastic 22. In contrast to the case of the lens pigment 1 represented on the left in FIG. 1, in the case of the lens pigment 19 shown in FIG. 3a, the outer contour of the carrier substrate 20 forming a lens base is not flush with the outer contour of the microlens 21, but the carrier substrate 20 has a certain protruding region with regard to the microlens 21.

FIG. 3b shows a further lens pigment 19 according to the invention in plan view. The lens pigment 19 is based on a carrier substrate 20 with a square outer contour, which is supplied on its front side with a first plastic producing a circular microlens. The first plastic forming a microlens is leveled by a second plastic (not shown in the figure).

FIG. 3c shows a further lens pigment 23 according to the invention in plan view. The lens pigment 23 is based on a carrier substrate 24 with a hexagonal outer contour, which is supplied on its front side with a first plastic producing a circular microlens 25. The first plastic forming a microlens is leveled by a second plastic (not shown in the figure).

FIG. 3d shows a further lens pigment 26 according to the invention in plan view. The lens pigment 26 is based on a carrier substrate 27 with a circular outer contour, which is supplied on its front side with a first plastic producing a circular microlens 28. The first plastic forming a microlens is leveled by a second plastic (not shown in the figure).

FIG. 4 shows a further lens pigment 29 according to the invention in an oblique view. The lens pigment 29 is based on a carrier substrate 30 which forms a lens base and is formed in the form of an irregular polygon. On its front side, the carrier substrate 30 has seven elevations 31 each producing a microlens, each of which is formed of a first plastic. The first plastic forming the seven microlenses is leveled by a second plastic (not shown in the figure). The second plastic thus has the same outer contour as the carrier substrate 30.

FIGS. 5a, 5b and 5c show three further lens pigments 32, 33 and 34 according to the invention, each of which has a plurality of elevations each producing a microlens. In the case of the lens pigment 32 nine microlenses are present, in the case of the lens pigments 33 and 34 there are four microlenses each. The lens pigments 32 and 33 each have a square outer contour; the lens pigment 34 has a triangular outer contour.

In the lens pigments 32, 33 and 34 shown in FIGS. 5a to 5c, the first plastic forming the microlenses is leveled by a second plastic (not shown in the figure). The second plastic thus has the same outer contour as the carrier substrate.

FIG. 6 shows an example of a detail from a layer structure 35 in a cross-sectional view for manufacturing a lens pigment according to the invention. The layer structure 35 contains a first plastic 36 with elevations each producing a microlens. The microlenses are directly adjacent to one another. The first plastic 36 is leveled by a second plastic 37. The carrier substrate and microstructures optionally present on the carrier substrate are not shown in FIG. 6.

FIG. 7 shows a further example of a detail from a layer structure 38 in a cross-sectional view for manufacturing a lens pigment according to the invention. The layer structure 38 contains a first plastic 39 with elevations each producing a microlens. The microlenses are not arranged directly adjacent to one another, but rather arranged in a manner spaced from one another. The first plastic 39 is leveled by a second plastic 40. The carrier substrate and microstructures optionally present on the carrier substrate are not shown in FIG. 7.

Figure 9:
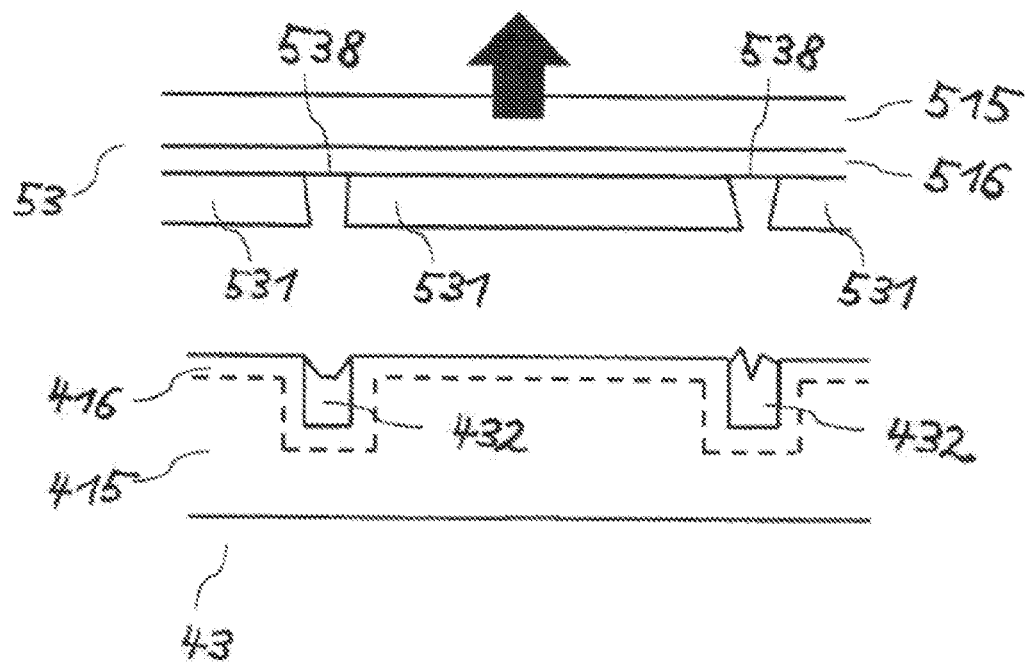

FIGS. 8 and 9 show a preferred method for manufacturing the lens pigment according to the invention in accordance with an exemplary embodiment.

In the embodiment shown in cross section in FIGS. 3a to 3d, the starting substrate 40 is supplied with a relief as a pre-structuring. The relief structure is formed by recessed sections 417. The starting substrate 40 comprises at least one starting substrate layer 415, in particular in the form of a PET foil, and the embossing lacquer layer 416. In accordance with the relief structure, pigment sections 411 and residual sections 412 of the pigment layer are formed. As already explained above, the term "pigment layer" means the layer sequence forming the lens pigment, comprising at least the carrier substrate forming a lens base, which is supplied on its front side with a first plastic having at least one elevation that produces a microlens and a second plastic leveling the first plastic. The pigment sections 411 lie on the elevated sections of the relief structure and the residual sections 412 in the depressions 417. The pigment sections 411 are already pre-structured corresponding to the contour of the later lens pigments. The residual sections 412 lying between the pigment sections 411 have a contour that is inverse to the lens pigments.

Likewise represented in FIG. 8, there is an intermediate substrate 50 which comprises an intermediate substrate layer 515, for example a further PET foil, and an unstructured adhesive layer 516. The intermediate substrate layer 50 is—as indicated by the arrow—brought into contact with the pigment layer 410. In the step, pressure can be exerted and the temperature can be increased. Due to the relief structure, the pigment layer 410 adheres with its pigment sections 411 to the adhesive layer 516 of the intermediate substrate. The residual sections 412 do not come into contact with the adhesive layer 516 at all, or at least not sufficiently to adhere to it.

The starting substrate and the intermediate carrier substrate are again separated from one another, as indicated in FIG. 9—again by an arrow. FIG. 9 shows the starting substrate including remnants of the pigment layer 43 and the intermediate substrate including pigment sections 53 already in the separated state.

When the two substrates are separated, the pigment layer breaks. It is structured into the individual pigments, which are present as pigment sections 531. The pigment sections 531 adhere to the adhesive layer 516 of the intermediate substrate. Between the pigment sections 531 there are free intermediate substrate surfaces 538 on the intermediate substrate 53. The residual sections 432 of the pigment layer are still present on the starting substrate 415, 416 after separating.

The pigment sections 531 are subsequently detached from the intermediate substrate and are then present in the form of a multiplicity of lens pigments. The lens pigments are processed into a printing ink.

At the time of structuring the pigment layer into pigment sections—by breaking and detaching the pigment sections from the starting substrate—the pigment sections are protected against breaking by the intermediate substrate. The pigment sections are not subjected to any unnecessary force and can therefore be constructed much thinner or more filigree than usual.

Figure 10:
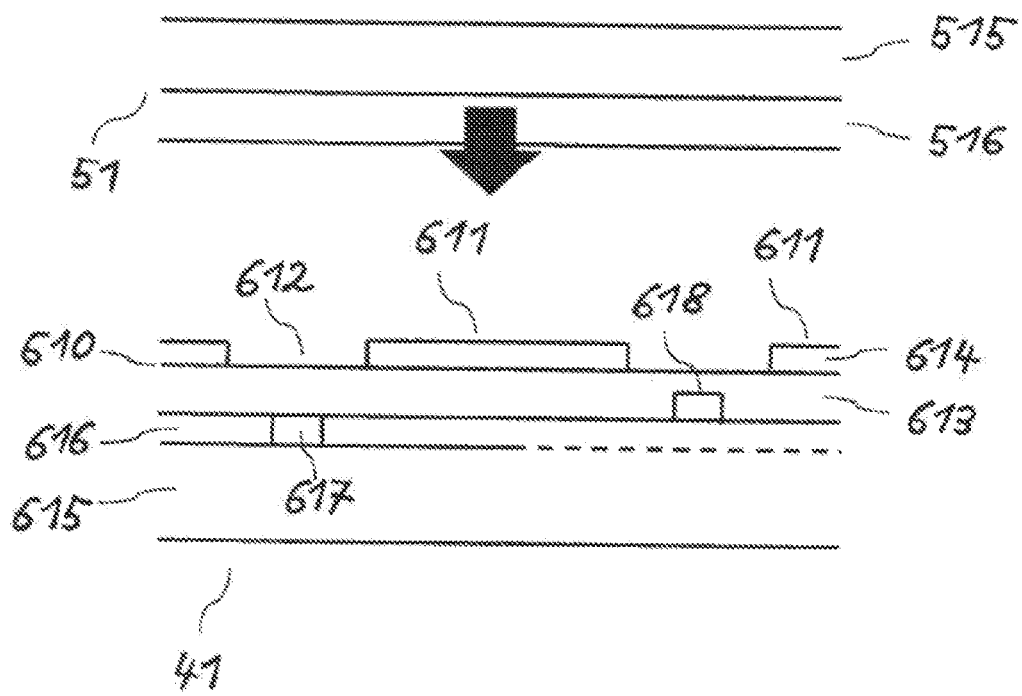
FIG. 10, 11 a preferred method for manufacturing the lens pigment according to the invention according to a further embodiment.
Figure 11:
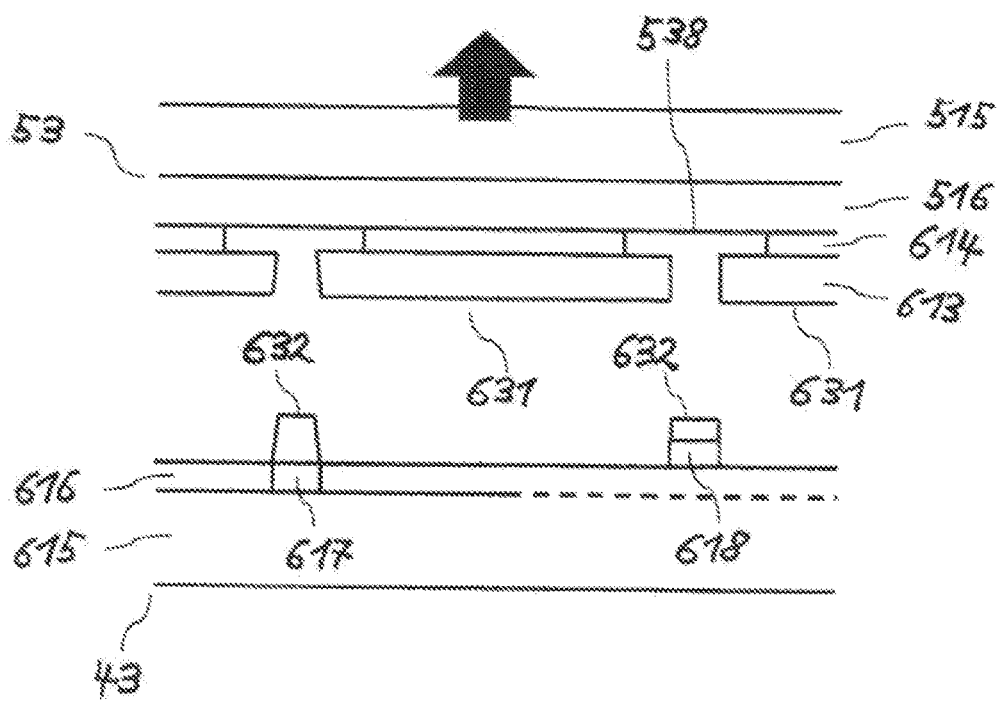

In the embodiment according to FIGS. 8 and 9, the pigment layer is pre-structured by a relief structure in order to predetermine the contour of the pigment. FIGS. 10 and 11 show alternative configurations in which a layer that determines the adhesion is structured in order to predetermine the contour.

The starting substrate with pigment layer 41 in FIG. 10 comprises a substrate layer 616, 617, 618 and a pigment layer 610, which in turn contains two partial layers 613, 614. On the PET foil 615 there is provided a structured adhesion-determining layer, which can be configured as a continuous anti-adhesive layer 616 with adhesive layer sections 617 or as an adhesive layer 618 arranged on the substrate layer 615 (or the anti-adhesive layer 616). The pigment layer 610 comprises the continuous pigment partial layer 613 as well as a non-continuous (but already structured) pigment partial layer 614. Pigment sections 611 of the pigment layer and residual sections 612 are predetermined by the adhesive structure 617, 618.

As represented symbolically in FIG. 10 by the arrow, the starting substrate 41 is brought into contact with the adhesive layer 516 on the intermediate substrate. The adhesive layer 516 can also come into contact with the residual sections 612, i.e. not only the pigment sections. The adhesive layer 516 and the adhesive structure 617, 618 are matched to one another in such a manner that the pigment layer adheres more strongly to the adhesive structure 617, 618. The pigment layer is in turn structured into the pigments (pigment sections) when the substrates are separated.

FIG. 11 shows the starting substrate with pigment layer residues 43 and the intermediate substrate including pigment sections 53 after the substrates have been separated. Residual sections 632 of the pigment layer adhere to the adhesive structure 617, 618. The pigment sections 631 adhere to the intermediate substrate, i.e. they have become detached from the starting substrate or its anti-adhesive layer 616 upon detaching. Free sections 538 of the adhesive layer 516 remain between the pigment sections. The pigment sections 631 comprise the two partial layers 613, 614. The pigment sections 631 are detached (after separating) from the intermediate substrate layer 515, 516 and processed further as pigments, in particular to form a printing ink.

The invention claimed is:

1. A lens pigment, suitable for the manufacture of value documents by printing technology, comprising:
   a carrier substrate which forms a lens base and which is supplied on its front side with a first plastic having at least one elevation that produces a microlens; and
   a second plastic leveling the first plastic;
   wherein the lens pigment has a maximum length of less than 100 μm.

2. The lens pigment according to claim 1, wherein the first plastic has a plurality of elevations each producing a microlens,
   wherein the plurality is an integer in a range from 1 to 12.

3. The lens pigment according to claim 1, wherein the lens pigment has a substantially mirror-symmetrical structure, so that the carrier substrate is supplied on both its front side and on its back side with a first plastic having at least one elevation that produces a microlens, and a second plastic leveling the first plastic.

4. The lens pigment according to claim 1, wherein the carrier substrate forming a lens base is supplied with microscopic structures on its front side and/or its back side,
   wherein the microscopic structures are recognizable for the viewer in the form of characters, patterns or codings as a result of the focusing effect of the microlenses.

5. The lens pigment according to claim 4, wherein the microscopic structures are microscopic structures produced by printing technology or microscopic structures produced by means of embossing.

6. The lens pigment according to claim 4, wherein the microlenses are arranged in the form of a first grid and the microscopic structures are arranged in the form of a second grid,
   wherein the grid width of the first and second grid lies in a range from 3 μm to 50 μm.

7. The lens pigment according to claim 1, wherein the front side and/or the back side of the carrier substrate forming a lens base, which is supplied with the first plastic and with microscopic structures, has an opaque layer.

8. The lens pigment according to claim 7, wherein the opaque layer is formed by a thin-film element,
   wherein the thin-film element is a color-shifting thin-film element with a structure having a reflector layer, a dielectric spacer layer and an absorber layer.

9. The lens pigment according to claim 1, wherein the second plastic has a refractive index which differs from the refractive index of the first plastic by at least 0.3.

10. The lens pigment according to claim 1, wherein the carrier substrate forming a lens base has a round shape including a circular or elliptical shape, or the shape of a polygon including a square, rectangular, triangular, pentagonal or hexagonal shape.

11. The lens pigment according to claim 1, wherein the carrier substrate forming a lens base additionally has a magnetic layer.

12. A method for manufacturing a lens pigment suitable for the manufacture of value documents by printing technology, the method comprising:
- making available a carrier substrate;
- supplying the carrier substrate with a first plastic;
- structuring the first plastic in order to form elevations in this manner which produce a microlens in each case;
- applying a second plastic leveling the first plastic;
- breaking up the layer structure produced in the preceding steps into a multiplicity of lens pigments;
- wherein each of the multiplicity of lens pigments has a maximum length of less than 100 μm.

13. The method according to claim 12, wherein the structuring of the first plastic takes place by means of embossing.

14. A value document which is printed with lens pigments according to claim 1.

15. The value document according to claim 14, wherein the lens pigments are arranged in a window region of the value document.

16. A printing ink, comprising lens pigments according to claim 1.

17. A lens pigment, suitable for the manufacture of value documents by printing technology, comprising:
- a carrier substrate which forms a lens base and which is supplied on its front side with a first plastic having at least one elevation that produces a microlens;
- a second plastic leveling the first plastic; and
- a solvent;
- wherein the lens pigment is suspended in the solvent.

* * * * *